(12) United States Patent
Yamaguchi

(10) Patent No.: US 12,125,615 B2
(45) Date of Patent: Oct. 22, 2024

(54) WIRING MODULE AND WIRING MEMBER WITH HOLDING MEMBER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Koji Yamaguchi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 130 days.

(21) Appl. No.: 17/912,793

(22) PCT Filed: Mar. 8, 2021

(86) PCT No.: PCT/JP2021/008863
§ 371 (c)(1),
(2) Date: Sep. 19, 2022

(87) PCT Pub. No.: WO2021/192942
PCT Pub. Date: Sep. 30, 2021

(65) Prior Publication Data
US 2023/0132776 A1 May 4, 2023

(30) Foreign Application Priority Data
Mar. 25, 2020 (JP) .................. 2020-054293

(51) Int. Cl.
H01B 7/40 (2006.01)
B60R 16/02 (2006.01)
H02G 3/04 (2006.01)

(52) U.S. Cl.
CPC .......... *H01B 7/40* (2013.01); *B60R 16/0215* (2013.01); *H02G 3/0418* (2013.01)

(58) Field of Classification Search
None
See application file for complete search history.

(56) References Cited

U.S. PATENT DOCUMENTS 3,346,688 A * 10/1967 Fields ................ F16L 3/23
24/339
5,012,391 A * 4/1991 Schultz, Jr. ............ H05K 3/103
29/850
(Continued)

FOREIGN PATENT DOCUMENTS

JP 2001-213165 A 8/2001
WO WO-03043396 A1 * 5/2003 ............... H02G 3/26
(Continued)

OTHER PUBLICATIONS

International Search Report issued on May 25, 2021 for WO 2021/192942 A1 (4 pages).

*Primary Examiner* — Krystal Robinson
(74) *Attorney, Agent, or Firm* — Venjuris, P.C.

(57) ABSTRACT

A wiring module includes a base member including an attachment surface on which an attachment target portion is formed, a plurality of wiring members arranged on the attachment surface, and a holding member attached to the attachment target portion while holding the plurality of wiring members. The holding member includes a holding portion formed by a plurality of grooves arranged side by side, and an attachment portion that is capable of being detachably attached to the attachment target portion. The (Continued)

attachment target portion is provided at each of the plurality of attachment locations along paths of the plurality of wiring members on the attachment surface, and at each of the plurality of attachment locations, the plurality of wiring members are divided, housed and held in the plurality of grooves.

12 Claims, 5 Drawing Sheets

(56) References Cited

U.S. PATENT DOCUMENTS

| | | | | |
|---|---|---|---|---|
| 5,092,647 | A | * | 3/1992 | Ueda .................. B60J 5/0416 |
| | | | | 49/167 |
| 5,716,044 | A | * | 2/1998 | Peterson ............ B60R 16/0207 |
| | | | | 174/72 A |
| 5,905,231 | A | | 5/1999 | Houte et al. |
| 6,274,813 | B1 | | 8/2001 | Houte et al. |
| 6,494,413 | B1 | * | 12/2002 | Saeki .................. F16L 3/237 |
| | | | | 24/561 |
| 2011/0162885 | A1 | | 7/2011 | Yamaguchi et al. |

FOREIGN PATENT DOCUMENTS

| | | |
|---|---|---|
| WO | 2008/099518 A1 | 8/2008 |
| WO | 2018/168890 A1 | 9/2018 |
| WO | 2019/187334 A1 | 10/2019 |

\* cited by examiner

WIRING MODULE AND WIRING MEMBER WITH HOLDING MEMBER

CROSS REFERENCE TO RELATED APPLICATIONS

This application is a national phase of PCT application No. PCT/JP2021/008863, filed on 8 Mar. 2021, which claims priority from Japanese patent application No. 2020-054293, filed on 25 Mar. 2020, all of which are incorporated herein by reference.

TECHNICAL FIELD

The present disclosure relates to a wiring module and a wiring member with holding member.

BACKGROUND

Patent Document 1 discloses a wiring member-integrated built-in component including a built-in component in which a wiring member accommodation groove is formed in one main surface and that is built into a box-shaped member so as to partition the inside and outside of the box-shaped member, and a wiring member held by the built-in component with at least a portion thereof in the extension direction is accommodated in the wiring member accommodation groove.

PRIOR ART DOCUMENT

Patent Document

Patent Document 1: WO 2019/187334 A

SUMMARY OF THE INVENTION

Problems to be Solved

Improvement of repairability in a wiring module in which wiring members are housed and held in grooves is desired.

In view of this, an object is to provide a technique that can improve repairability in a wiring module in which wiring members are housed in grooves.

Means to Solve the Problem

A wiring module according to the present disclosure is a wiring module including a base member including an attachment surface on which an attachment target portion is formed, a plurality of wiring members arranged on the attachment surface, and a holding member attached to the attachment target portion while holding the plurality of wiring members, wherein the holding member includes a holding portion formed by a plurality of grooves arranged side by side, and an attachment portion configured to be detachably attached to the attachment target portion, the attachment target portion is provided at each of a plurality of attachment locations along paths of the plurality of wiring members on the attachment surface, and at each of the plurality of attachment locations, the plurality of wiring members are divided, housed and held in the plurality of grooves.

Effect of the Invention

According to the present disclosure, repairability can be improved in a wiring module in which wiring members are housed in grooves.

DETAILED DESCRIPTION TO EXECUTE THE INVENTION

Description of Embodiment of Disclosure

Figure 1:
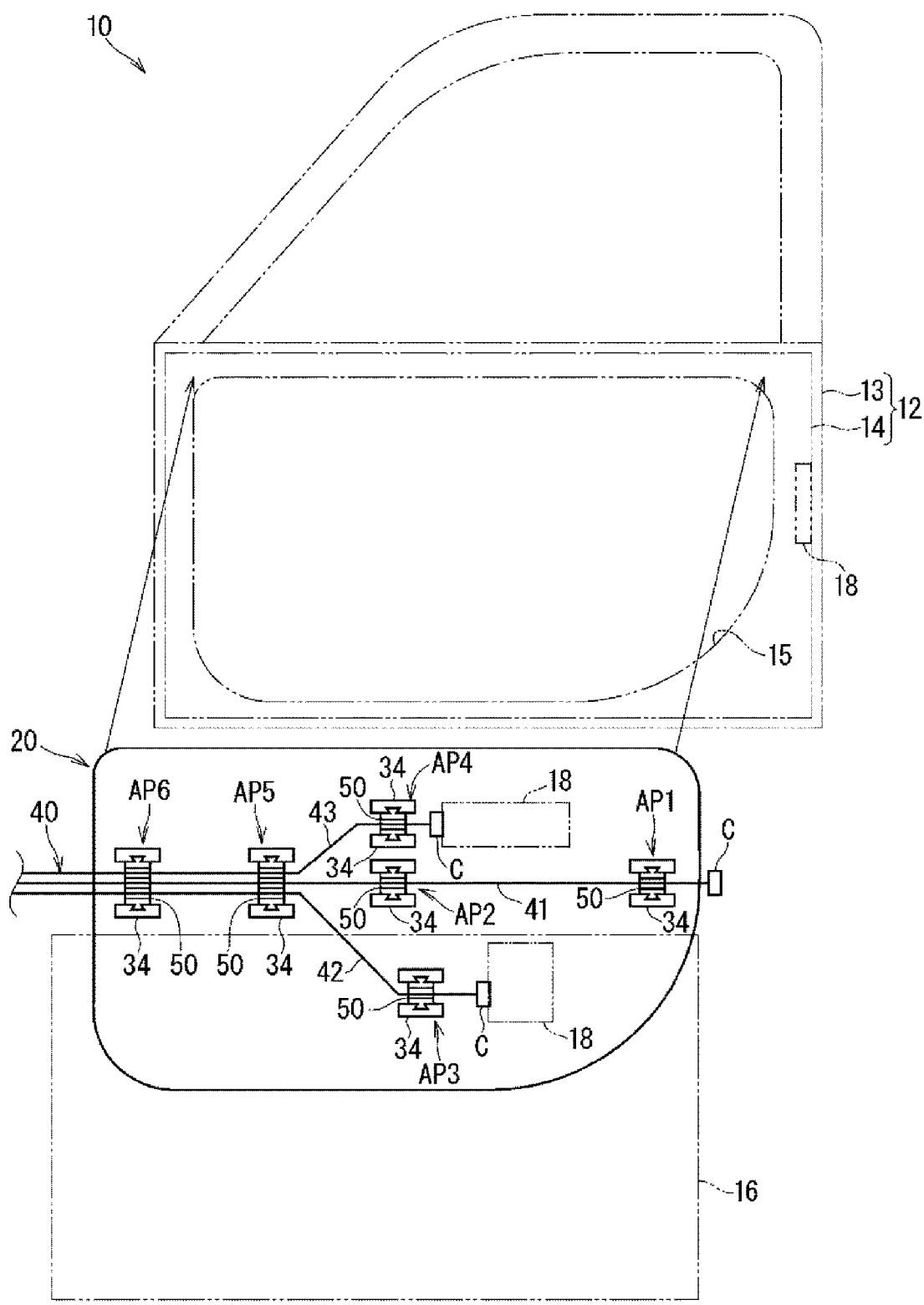
FIG. 1 is a schematic plan view showing a wiring module according to a first embodiment.

First, embodiments of the present disclosure will be listed and described.

A wiring module according to the present disclosure is as follows.

(1) A wiring module including a base member including an attachment surface on which an attachment target portion is formed, a plurality of wiring members arranged on the attachment surface, and a holding member attached to the attachment target portion while holding the plurality of wiring members, wherein the holding member includes a holding portion formed by a plurality of grooves arranged side by side, and an attachment portion configured to be detachably attached to the attachment target portion, the attachment target portion is provided at each of a plurality of attachment locations along paths of the plurality of wiring members on the attachment surface, and at each of the plurality of attachment locations, the plurality of wiring members are divided, housed and held in the plurality of grooves. Since the holding member is detachably attached to the base member, when the wiring members need to be repaired, the wiring members can be detached from the base member together with the holding member. Even if the wiring members are detached from the base member together with the holding member, the base member does not need to be replaced or repaired. In this manner, repairability can be improved in the wiring module in which the wiring members are housed in the grooves.

(2) A configuration is also possible in which in a state where at least the holding member is not attached to the base member, the holding portion is elastically deformable such that openings of the grooves that are on the opposite side to bottoms of the grooves widen. In this manner, since the wiring members are detachably held in the grooves, when a portion of the plurality of wiring members needs to be repaired, even if that portion of the wiring members is detached from the holding member, the holding member does not need to be replaced or repaired. In this manner, repairability in the wiring module can be improved.

(3) A configuration is also possible in which in a state where the holding member is not attached to the base member, the holding portion is elastically deformable so as to bend around an axis parallel with an extension direction of the grooves, the openings of the grooves that are on the opposite side to the bottoms of the grooves widen in a state where the holding portion bends in one direction around the axis, and the attachment portion is attached to the attachment target portion in a manner capable of inhibiting the holding portion from bending in the one direction around the axis. In this manner, when the wiring members need to be removed from and attached to the grooves, by the holding portion being removed and attached in a bent state, the wiring members can be easily removed and attached. Also, in the wiring module in the state where the holding portion is attached to the base member, removal and attachment of the wiring members from and to the grooves can be inhibited.

(4) A configuration is also possible in which protrusions that narrow a width dimension of the grooves are formed at the openings of the grooves that are on the opposite side to the bottoms of the grooves. In this manner, due to the protrusions, the wiring members housed in the grooves can be inhibited from coming out of the grooves. Further, even if the protrusions are provided, when the wiring members need to be removed from and attached to the grooves, such removal and attachment can be easily performed by the opening portions being widened due to elastic deformation of the holding portion.

(5) A configuration is also possible in which the holding member further includes a first linking portion provided on one side of the holding portion and a second linking portion provided on the other side of the holding portion, and in at least one attachment locations of the plurality of attachment locations, the first linking portion of one holding member and the linking portion of another holding member link to each other. In this manner, a single kind of holding member can easily support various modes of wiring members.

(6) A configuration is also possible in which the holding member further includes a lid portion for covering the plurality of grooves. In this manner, due to the lid portion, the wiring members can be inhibited from coming out of the grooves.

(7) A configuration is also possible in which the attachment portion and the attachment target portion are provided at two sides of the holding portion, and the attachment portion is detachably attached to the attachment target portion by a protrusion formed at one of the attachment portion and the attachment target portion fitting in a recess formed at the other of the attachment portion and the attachment target portion. In this manner, the holding member can be attached to and detached from the base member in a simple manner.

(8) A configuration is also possible in which a fitting groove to which the holding portion fits is formed in the attachment surface. In this manner, an increase in height of the wiring module in the normal direction of the attachment surface can be suppressed.

(9) A wiring member with holding member according to the present disclosure includes a plurality of wiring members, and a plurality of holding members divided and provided in a plurality of attachment locations arranged at intervals along an extension direction of the plurality of wiring members, wherein each of the plurality of holding members includes a holding portion formed by a plurality of grooves arranged side by side, and an attachment portion that is configured to be detachably attached to an attachment partner, and at each of the plurality of attachment locations, the plurality of wiring members are divided, housed and held in the plurality of grooves. The plurality of holding members are provided separately at the plurality of attachment locations at intervals along the extension direction of the plurality of wiring members, and at each of the attachment locations, the plurality of wiring members are separately housed and held in the plurality of grooves in a state of being arranged side by side. Then, due to the attachment portion provided at the holding member, the wiring members with holding member can be detachably attached to the attachment partner. In this manner, repairability can be improved.

DESCRIPTION OF EMBODIMENTS OF DISCLOSURE

Specific examples of the wiring module and the wiring members with holding member according to the present disclosure will be described below with reference to the drawings. Note that the present disclosure is not limited to these examples, but defined in the claims, and is intended to include all modifications within the meaning and the scope equivalent thereof.

First Embodiment

Hereinafter, a wiring module and wiring members with holding member according to a first embodiment will be described. FIG. 1 is a schematic plan view showing a wiring module 20 according to the first embodiment. In the following description, the wiring module 20 is assumed to be embedded in a door 10 of a vehicle. First, the door 10 in which the wiring module 20 is embedded will be described.

The door 10 is a generally flat-shaped part openably/closably provided so as to partition the inside and outside of a vehicle cabin of the vehicle. It is assumed that the door 10 is a driver's door, a passenger door, a rear door, or the like. The door 10 includes a door panel 12 and a door trim 16.

The door panel 12 includes an outer panel 13 and an inner panel 14. The outer panel 13 is provided at a portion of the door 10 that faces outward of the vehicle. The outer panel 13 is a portion constituting the outer appearance of the vehicle together with a body. The inner panel 14 is provided on the vehicle cabin side of the outer panel 13. An opening 15 is provided in the inner panel 14. The opening 15 is also referred to as a service hole or the like.

The door trim 16 is provided at a portion of the door 10 that faces inward of the vehicle. The door trim 16 is attached on the inner side of the door panel 12. The door trim 16 is a portion that constitutes the inner appearance of the vehicle.

Devices 18 are embedded in the door 10. The devices 18 embedded in the door 10 depend on the type, grade, option, and the like of the vehicle. For example, the devices 18 are assumed to include a motor for opening/closing a window, an actuator for locking/unlocking the door 10, a speaker, a courtesy lamp, various kinds of switches, and an electronic control unit for controlling these devices. A portion or all of the devices 18 embedded in the door 10 may also be embedded in a base member 30.

A wiring module 20 is embedded between the door panel 12 and the door trim 16. The wiring module 20 is provided for supplying power to the devices 18 or transmitting signals between the devices 18 and the vehicle body side devices. For example, the wiring module 20 is attached to the inner panel 14 so as to close the opening 15.

Figure 2:
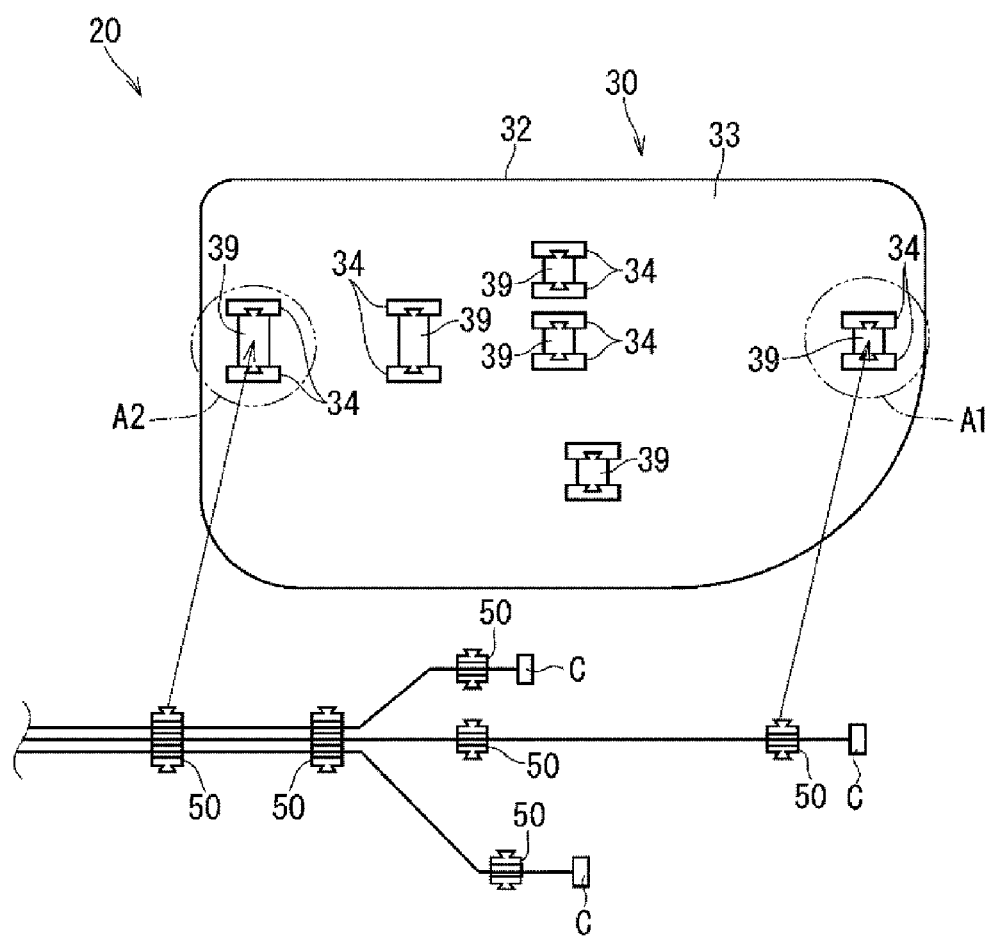
FIG. 2 is a schematic exploded plan view of the wiring module.
Figure 3:
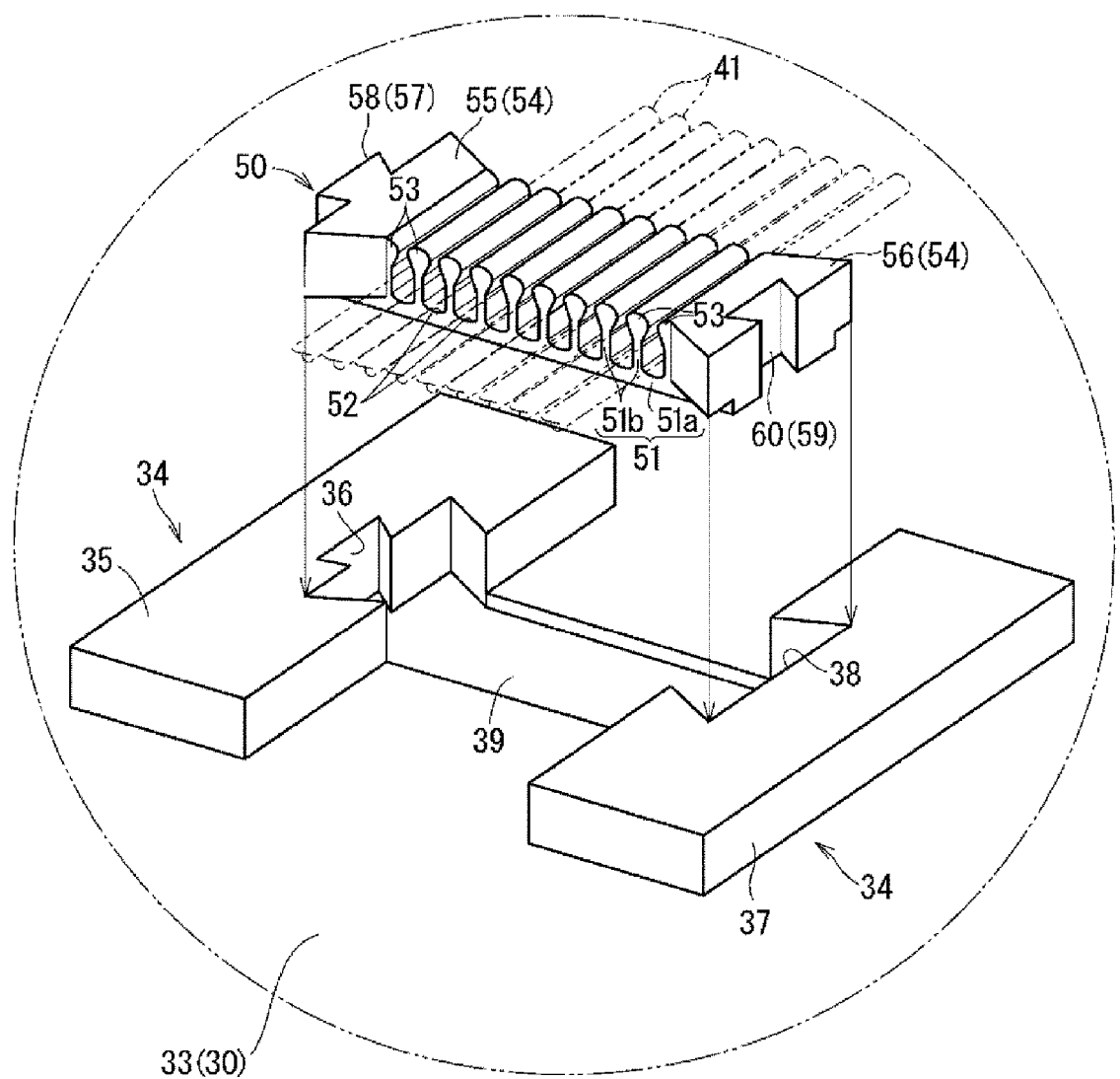
FIG. 3 is an enlarged perspective view of a region A1 in FIG. 1.
Figure 4:
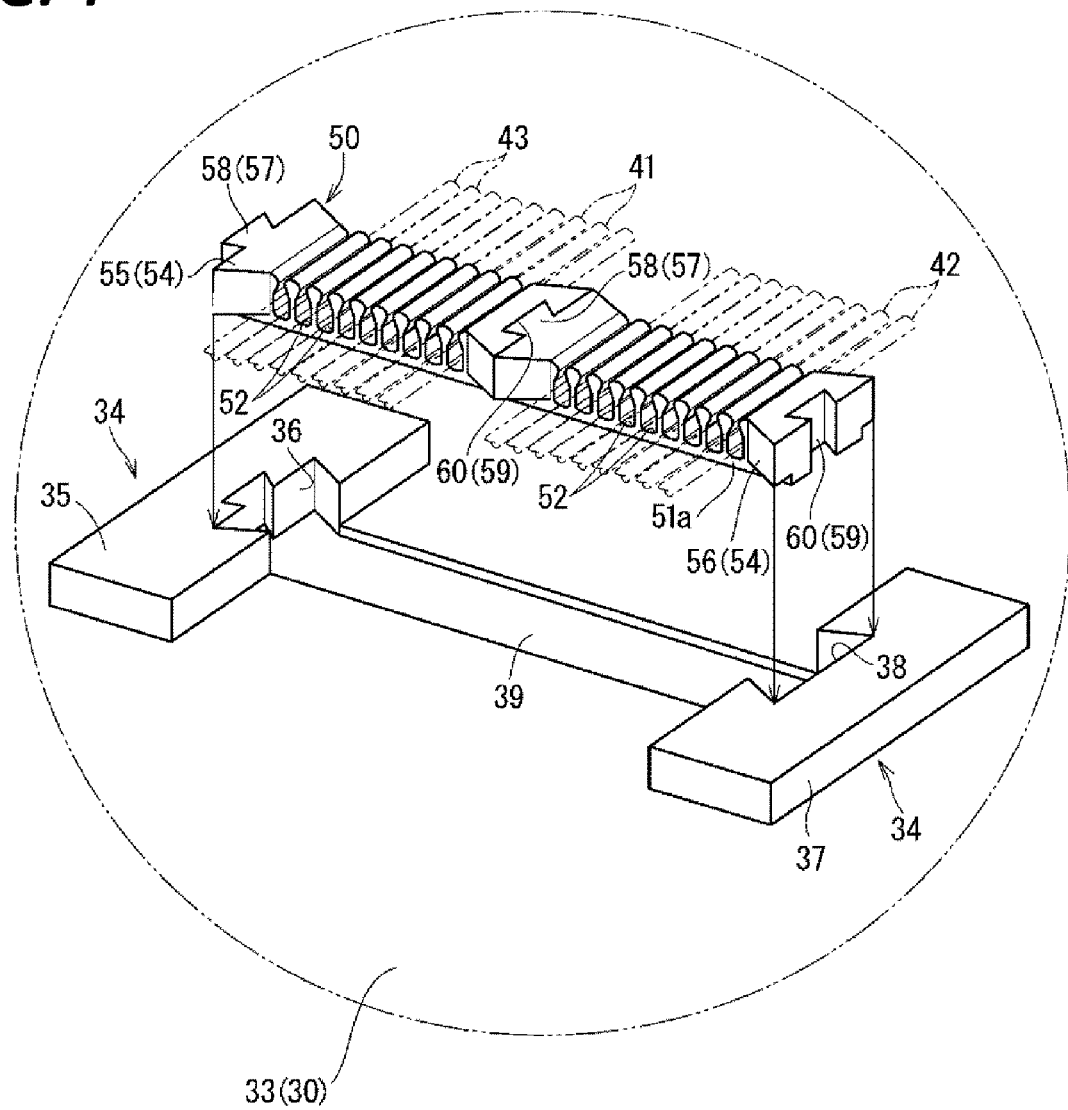
FIG. 4 is an enlarged perspective view of a region A2 in FIG. 1.

The wiring module 20 will be described in detail with reference to FIGS. 2 to 5. FIG. 2 is a schematic exploded plan view of the wiring module 20. FIG. 3 is an enlarged perspective view showing a region A1 in FIG. 1. FIG. 4 is an enlarged perspective view showing a region A2 in FIG.

Figure 5:
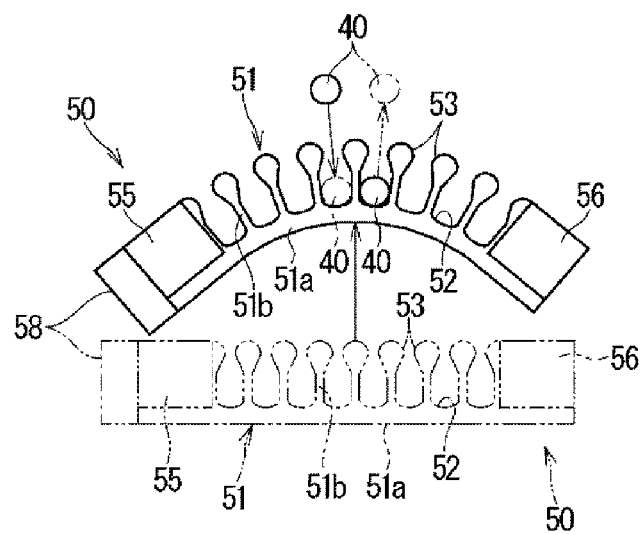
FIG. 5 is a front view showing a holding member.

1. FIG. 5 is a front view showing a holding member 50. The wiring module 20 is provided with the base member 30, a plurality of wiring members 40, and the holding member 50.

Base Member

The base member 30 is arranged between the door panel 12 and the door trim 16 of the door 10. The base member 30 is a member that planarly extends with respect to the door panel 12 and the door trim 16. The base member 30 is a flat component that extends to the same extent as or wider than the opening 15. The base member 30 closes the opening 15 in a state of being attached to the opening 15 of the inner panel 14. In this manner, the base member 30 can partition the inside and outside of the vehicle. In the state where the base member 30 is attached to the opening 15 of the inner panel 14, such an attached state is maintained through screwing, a locking structure, or the like. For example, if a portion of the periphery of the base member 30 that is overlapped with the inner panel 14 is fixed onto the inner panel 14 through screwing or the like, a gap between the base member 30 and the inner panel 14 can be closed as much as possible.

In the state where the base member 30 is attached to the inner panel 14, a space is generated between the outer panel 13, the inner panel 14, and the base member 30. A window of the door 10 can be housed in this space. The window, which is exposed to a rainwater environment, is housed in the space, and a slit-like opening through which the window goes in and out is formed above the space. For this reason, water may infiltrate the space. Also, since the space may communicate with the external space, wind noise from the outside and the like may infiltrate the space. The base member 30 is provided as a member that partitions the space inside the vehicle cabin and the external space more completely, together with the inner panel 14.

More specifically, the base member 30 is a molded article made of a resin, metal, or the like. The base member 30 includes a main plate portion 32. The main plate portion 32 is a portion that planarly extends to be large enough to be able to close the opening 15. Here, a surface of the main plate portion 32 that faces inward of the vehicle is an attachment surface 33. A surface of the main plate portion 32 that faces outward of the vehicle may also be the attachment surface. Of the main plate portion 32, both the surface that faces inward of the vehicle and the surface that faces outward of the vehicle may also be the attachment surfaces.

The attachment surface 33 may have a flat shape. The attachment surface 33 may also have an uneven shape. A portion of the attachment surface 33 that covers the opening 15 may be recessed outward of the vehicle with respect to a portion that covers the peripheral edge of the opening 15 and enter the opening 15. The plurality of wiring members 40 are arranged on the attachment surface 33. A portion of the attachment surface 33 that extends along paths on which the wiring members 40 are arranged may also have a flat shape. A portion along the paths on which the wiring members 40 are arranged may have an uneven shape.

Attachment target portions 34 are formed on the attachment surface 33. Attachment portions 54 of the holding member 50 are attached to the attachment target portions 34. In this manner, the holding member 50 is attached to the base member 30. The attachment target portion 34 is provided at each of a plurality of (here, six) attachment locations AP along the plurality of paths of the plurality of wiring members 40 on the attachment surface 33. The location of the attachment locations AP, the shape of the attachment target portions 34 and the like will be described in detail later.

Wiring Members

The plurality of wiring members 40 are arranged on the attachment surface 33. The plurality of wiring members 40 are held by the holding member 50. The wiring members 40 are connected to the devices 18. The wiring members 40 are wirings for supplying power to the devices 18 or transmitting signals between the devices 18 and the vehicle body side devices. Here, the wiring members 40 include a plurality of wires 41, 42, and 43. The plurality of wires 41, 42, and 43 may also be coated wires. The coated wires each include a core wire and a coating layer surrounding the core wire. The wires 41, 42, and 43 may be single core wires or multi-core wires. The wiring members 40 may include optical fiber cables.

The plurality of wires 41, 42, and 43 include a first wire 41, a second wire 42, and a third wire 43. The first wire 41, the second wire 42, and the third wire 43 are respectively connected to different devices 18. The number of the first wire 41, the second wire 42, and the third wire 43 is one or more, and is set in accordance with the device 18.

The first wire 41, the second wire 42, and the third wire 43 are collected in parallel with each other at the end portions on one side thereof. The end portions on one side of the plurality of wires 41, 42, and 43 extend from the door 10 from the hinge side of the door 10 in a collected state, and are guided into the vehicle main body. It is assumed that the end portions on one side of the plurality of wires 41, 42, and 43 are connected to the other connectors provided at the wiring end portion in the vehicle main body via a common connector or the like, for example. This makes it possible for power supply to the devices 18, communication between the devices 18 and the vehicle body side devices, and the like via the wiring members 40 to be performed. Note that, if an electronic control unit is provided at the door 10, it is preferable that a wiring member for connecting the electronic control unit and the wiring inside the vehicle main body, and a wiring member for connecting the electronic control unit and the devices 18 are provided, as the wiring members 40.

End portions on the other side of the first wire 41, the second wire 42, and the third wire 43 are connected to the devices 18. Here, wiring side connectors C are attached to the end portions on the other side of the first wire 41, the second wire 42, and the third wire 43. Device side connectors are provided at the devices 18. The wiring side connectors C are connected to the device side connectors. The wires 41, 42, and 43 may be connected to the devices 18 without the connectors C interposed therebetween.

The plurality of wires 41, 42, and 43 extend from the end portions on the one side, in a collected state, on the base member 30. The plurality of wires 41, 42, and 43 branch into the first wire 41, the second wire 42, and the third wire 43 on the base member 30. Note that, in the example shown in FIG. 1, the first wire 41, the second wire 42, and the third wire 43 branch at one branch location on the base member 30. The first wire 41, the second wire 42, and the third wire 43 may also branch at different locations on the base member 30. For example, the first wire 41 and the second wire 42 may branch at a first branch location, the first and second wires 41 and 42, and the third wire 43 may branch at a second branch location that is closer to the door hinge relative to the first branch location. The first wire 41, the second wire 42, and the third wire 43 extend from the branch location to the devices 18 along paths corresponding to the locations of the devices 18. The paths from the branch locations to the devices 18 may be any paths, but they are preferably the shortest paths as much as possible. The portion where the plurality of wires 41, 42, and 43 are collected is a trunk line portion. The portions of the first wire 41, the second wire 42, and the third wire 43 that individually extend after the plurality of wires 41, 42, and 43 branch are branch line portions Holding Members The holding members 50 hold the wiring members 40. Each holding members 50 is attached to an attachment target portion 34. In this manner, the holding members 50 hold the wiring members 40 in a state of being arranged on the base member 30. The holding members 50 are respectively attached to the plurality of attachment locations AP. At each of the plurality of attachment locations AP, the plurality of wiring members 40 are divided, housed, and held in a plurality of grooves 52 of the holding member 50. The holding members 50 each include a holding portion 51 and an attachment portion 54. The holding members 50 each further include a first linking portion 57 and a second linking portion 59. The holding members 50 are integrated molded articles for which a resin or the like is used as the material. The holding members may be formed by combining a plurality of parts that are separately molded.

The plurality of grooves 52 are formed side by side in each holding portion 51. The grooves 52 house the wiring members 40. The holding portion 51 includes a bottom plate 51a and a plurality of partitions 51b. The bottom plate 51a has a plate-like shape that is elongated in one direction. Here, the bottom plate 51a has a rectangular plate-like shape. The plurality of partitions 51b are provided on the bottom plate 51a at intervals in the lengthwise direction. The plurality of partitions 51b protrude from the bottom plate 51a in one direction in parallel with each other. A portion surrounded by the two partitions 51b facing each other and the bottom plate 51a form a groove 52. Here, eight grooves 52 are formed in one holding portion 51. Of course, the number of the grooves 52 formed in one holding portion 51 is not limited to this, and can be set as appropriate. One or a plurality of wires may be housed in each groove 52.

The holding portion 51 further includes protrusions 53. The protrusions 53 are each provided at the opening portion of each groove 52. The protrusions 53 narrow the width dimension of the grooves 52. The protrusions 53 are respectively formed at leading end portions of the partitions 51b. The protrusions 53 each protrude from one partition 51b toward another partition 51b that opposes the one partition 51b.

A surface of each protrusion 53 that faces toward the bottom plate 51a is an inward facing surface. The protruding dimension of the inward facing surface from the partition 51b gradually decreases toward the bottom plate 51a. The inward facing surface functions as a guide surface when the wiring members 40 are removed from the grooves 52. A surface of the protrusion 53 on the opposite side to the inward facing surface is an outward facing surface. The protruding dimension of the outward facing surface from the partition 51b gradually decreases toward the opposite side to the bottom plate 51a. The outward facing surface functions as a guide surface when the wiring members 40 are housed in the grooves 52.

The attachment portions 54 are detachably attached to the attachment target portions 34. The attachment portions 54 are respectively provided at the two sides of the holding portion 51. The attachment target portions 34 are provided at locations corresponding to the attachment portions 54. The attachment portions 54 can be detachably attached to the attachment target portions 34 by a protrusion formed at one of the attachment portion 54 and the attachment target portion 34 fitting into a recess formed in the other of the attachment portion 54 and the attachment target portion 34. The direction in which the attachment portions 54 are attached to the attachment target portions 34 is a direction parallel with a normal direction of the attachment surface 33 and parallel with a normal direction of the bottom plate 51a. The attachment portions 54 may be a clamp or the like. Here, the attachment portions 54 each include a first protrusion 55 and a second protrusion 56.

The first protrusion 55 is provided on one side of each holding portion 51. The second protrusion 56 is provided on the other side of the holding portion 51. The first protrusion 55 and the second protrusion 56 are formed in the same shape. The width dimensions of the first protrusion 55 and the second protrusion 56 increase with distance from the holding portion 51.

The attachment target portions 34 each include a first wall portion 35 and a second wall portion 37 protruding on the attachment surface 33. A first recess 36 is formed in the first wall portion 35. The first recess 36 is formed in a shape that conforms to a shape obtained by combining the first protrusion 55 and a linking protrusion 58 (described later). A second recess 38 is formed in the second wall portion 37. The second recess 38 is formed in a shape that conforms to the second protrusion 56. The first protrusion 55 fits to the first recess 36, the second protrusion 56 fits to the second recess 38, and thus the attachment portions 54 are attached to the attachment target portions 34.

A fitting recess 39 to which the holding portion 51 fits is formed on an attachment surface 33. The bottom plate 51a fits to the fitting recess 39. The fitting recess 39 is formed in a shape that conforms to the bottom plate 51a. Here, since the bottom plate 51a is formed in a rectangular shape, the fitting recess 39 is also formed in a rectangular recess in a plan view. The depth dimension of the fitting recess 39 is set the same as the thickness dimension of the bottom plate 51a. In this manner, the bottom portion of the groove 52 has the same height as the attachment surface 33. Accordingly, in the wiring module 20, the wiring members 40 are likely to extend straight at the front and rear of the holding member 50. Note that, a fitting recess 39 to which the holding portion 51 fits does not need to be formed in the attachment surface 33.

The first linking portion 57 and the second linking portion 59 are portions that allow the holding members 50 to be linked to each other. The first linking portion 57 is provided on one side of the holding portion 51. The second linking portion 59 is provided on the other side of the holding portion 51. The direction in which the first linking portion 57 and the second linking portion 59 link to each other is a direction parallel to the normal direction of the bottom plate 51a. In at least one attachment location AP out of the plurality of APs, the first linking portion 57 of one holding member 50 links to the second linking portion 59 of the other holding member 50.

Here, six attachment locations AP are provided. Out of the six attachment locations AP, one holding member 50 is attached to each of the four attachment locations AP1, AP2, AP3, and AP4. The holding members 50 to be attached to the attachment locations AP1 and AP2 hold the wires 41 out of the branched wires 41, 42, and 43. The holding member 50 attached to the attachment location AP3 holds the wires 42 out of the branched wires 41, 42, and 43. The holding member 50 attached to the attachment location AP4 holds the wires 43 out of the branched wires 41, 42, and 43.

Two holding members 50 are attached to each of the two attachment locations AP5 and AP6 out of the six attachment locations AP. The holding members 50 attached to the attachment locations AP5 and AP6 hold the wires 41, 42, and 43 before branching. The numbers of holding members 50 to be attached are different between the attachment locations AP1 to AP4 and the attachment locations AP5 and AP6.

Here, the first linking portion 57 and the second linking portion 59 are provided separately from the attachment portion 54. The first linking portion 57 includes the linking protrusion 58. The linking protrusion 58 laterally protrudes from the first protrusion 55. The width dimension of the linking protrusion 58 increases proceeding laterally away from the first protrusion 55. The second linking portion 59 includes a linking recess 60. The linking recess 60 is formed such that a side surface of the second protrusion 56 is recessed toward the holding portion 51. The linking recess 60 is formed in a shape that conforms to the linking protrusion 58. The two holding members 50 are linked by the linking protrusion 58 of one holding member 50 fitting into the linking recess 60 of the other holding member 50.

Since the linking protrusion 58 laterally protrudes from the first protrusion 55, in the attachment target portions 34, the first recess 36 to which the first protrusion 55 fits is formed in a shape obtained by combining the first protrusion 55 and the linking protrusion 58. The linking recess 60 is formed such that a portion of the second protrusion 56 is recessed. For this reason, even if the second recess 38 is formed in a shape that conforms to the second protrusion 56, the second protrusion 56 can fit to the second recess 38. A protrusion to fit to the linking recess 60 may be formed in the second recess 38.

The link between the two linked holding members 50 can be released in a state of being removed from the base member 30. Here, the direction in which the two holding members 50 link to each other and the direction in which the holding member 50 is attached to the base member 30 are the same. For this reason, the link between the two linked holding members 50 can be released in a state of being attached to the base member 30 as well.

The holding member 50 including the first linking portion 57 and the second linking portion 59 is formed in a shape that is rotationally asymmetrical with respect to an axis along the normal direction of the bottom plate 51a. In this manner, the holding member 50 is unlikely to be attached to the base member 30 in a wrong orientation. Note that the holding member 50 including the first linking portion 57 and the second linking portion 59 may be formed in a shape that is rotationally symmetrical with respect to the axis along the normal direction of the bottom plate 51a. For example, due to the first linking portion 57 and the second linking portion 59 each including a pair of a protrusion and a recess, they are formed in a shape that is rotationally symmetrical with respect to the axis along the normal direction of the bottom plate 51a. In this manner, no matter which of leftward or rightward is the orientation in which the holding member 50 is attached to the wiring members 40, the holding member 50 can be attached to the base member 30. In this manner, the orientation of the holding member 50 does not need to be considered when attaching the holding member 50 to the wiring members 40.

Note that, in the case where the first linking portion 57 and the second linking portion 59 are omitted, the holding member 50 is formed in a shape that is rotationally symmetrical with respect to the axis along the normal direction of the bottom plate 51a.

In a state where at least the holding member 50 is not attached to the base member 30, the holding portion 51 can elastically deform such that the openings of the grooves 52 on the opposite side to the bottoms thereof are widened. For example, due to a partition 51b between the adjacent grooves 52 inclining toward the one groove 52, the opening of the other groove 52 can be widened.

Here, in the state where the holding member 50 is not attached to the base member 30, the holding portion 51 can elastically deform so as to bend around an axis parallel to the extension direction of the grooves 52. In a state where the holding portion 51 is bent in one axial direction, the openings of the grooves 52 on the opposite side to the bottoms thereof are widened. Here, as shown in FIG. 5, the bottom plate 51a can be elastically deformed so as to be bent around the axis. In the state where the bottom plate 51a is bent in the one axial direction, the partitions 51b facing each other extend in the direction of separating from each other proceeding from the base end portions on the bottom plate 51a side toward the leading end portions thereof. In the partitions 51b facing each other, gaps at the leading end portions are larger than the gaps at the base end portions. In this manner, the openings of the grooves 52 are widened.

The holding members 50 are formed by an elastically deformable material such that the bottom plate 51 can bend around the axis. For example, the material for the holding members 50 may also be an elastomer such as rubber. For example, the material for the holding members 50 may also be a thermoplastic elastomer such as olefin-based elastomer.

The attachment portions 54 are attached to the attachment target portions 34 such that bending of the holding portion 51 in one axial direction can be suppressed in the state where the holding member 50 is attached to the base member 30. Here, the attachment portions 54 and the attachment target portions 34 are attached to the two sides of the holding portion 51. In this manner, bending of the holding portion 51 in one axial direction can be suppressed in the state where the holding member 50 is attached to the base member 30. Further, the bottom plate 51a is in surface contact with the attachment surface 33. In this manner as well, bending of the holding portion 51 to one axial direction can be suppressed in the state where the holding member 50 is attached to the base member 30.

For example, a configuration is also possible in which the first protrusion 55 and the second protrusion 56 of the attachment portion 54 are formed slightly larger than the first recess 36 and the second recess 38 of the attachment target portions 34, and the first protrusion 55 and the second protrusion 56 are pressed into the first recess 36 and the second recess 38. If the material for the holding member 50 is an elastomer, when the first protrusion 55 and the second protrusion 56 are pressed into the first recess 36 and the second recess 38, the holding member 50 is unlikely to come out of the base member 30.

The holding portion 51 may also be elastically deformable such that the openings of the grooves 52 are widened in the state where the holding member 50 is attached to the base member 30. For example, due to the partition 51b between the adjacent grooves 52 being inclined toward one groove 52, the opening of the other groove 52 can be widened. In this case, it is preferable that an elastic force is set such that the wiring members 40 will not come out of the grooves 52 due to a force that is applied when the vehicle is in normal use (e.g., vibration at the time of opening/closing the door 10). The threshold at which the wiring members 40 come out of the grooves 52 is greater than or equal to a force that is applied when the vehicle is in normal use. When a force greater than the threshold is applied, the wiring members 40 come out of the grooves 52. The holding portion 51 may not be elastically deformable such that the openings of the grooves 52 are widened in the state where the holding member 50 is attached to the base member 30.

Also, as shown in FIG. 2, the wiring members 40 with the holding member 50 provided at predetermined locations are referred to as "wiring members 40 with holding member 50". The holding member 50 of these wiring members 40 with holding member 50 is attached to the attachment target portions 34, and thus the wiring module 20 is formed.

Effects and the Like of First Embodiment

According to the wiring module 20 and the wiring members 40 with holding member 50 configured as above, since the holding member 50 is attachable to/detachable from the base member 30, when the wiring members 40 need to be repaired, the wiring members 40 can be detached from the base member 30 together with the holding member 50. Even if the wiring members 40 are detached from the base member 30 together with the holding member 50, the base member 30 does not need to be replaced or repaired. In this manner, according to the wiring module 20 in which the wiring members 40 are housed in the grooves 52, repairability can be improved. Note that, a configuration is also possible in which the wiring members 40 can be detached from the base member 30 together with the holding member 50 while the base member 30 remains attached to the vehicle.

Further, in a state where at least the holding member 50 is not attached to the base member 30, the holding portion 51 can elastically deform such that the openings of the grooves 52 on the opposite side to the bottoms thereof are widened. In this manner, since the wiring members 40 are detachably held in the grooves 52, when a portion of the plurality of wiring members 40 needs to be repaired, even if that portion of the wiring members 40 is detached from the holding member 50, the holding member 50 does not need to be replaced or repaired. In this manner, repairability in the wiring module 20 can be improved.

Further, in a state where the holding member 50 is not attached to the base member 30, the openings of the grooves 52 on the opposite side to the bottoms thereof are widened with the holding portion 51 bending in one axial direction. Further, the attachment portions 54 are attached to the attachment target portions 34 such that the holding portion 51 can be inhibited from bending in the one axial direction. In this manner, when the wiring members 40 need to be removed from and attached to the grooves 52, by the holding portion 51 being removed from and attached to the grooves 52 in a bent state, the wiring members 40 can be easily removed from and attached to the grooves 52. Further, in the wiring module 20, the wiring members 40 can be inhibited from being detached from and attached to the grooves 52.

Further, the protrusions 53 that narrow the width dimension of the grooves 52 are formed at the openings of the grooves 52. In this manner, due to the protrusions 53, the wiring members 40 housed in the grooves 52 can be inhibited from coming out of the grooves 52. Also, even if the protrusions 53 are formed, when the wiring members 40 need to be removed from and attached to the grooves 52, the wiring members 40 can be easily removed from and attached to the grooves 52 due to elastic deformation of the holding portion 51.

Further, in at least one attachment location out of the plurality of attachment locations, the first linking portion 57 of the one holding member 50 is linked to the second linking portion 59 of another holding member 50. In this manner, a single kind of holding member 50 can support various types of the wiring members 40.

Further, the attachment portions 54 and the attachment target portions 34 are provided on the two sides of the holding portion 51, and the protrusion formed at one of the attachment portions 54 and the attachment target portions 34 fits to the recess formed in the other, making it possible for the attachment portions 54 to be detachably attached to the attachment target portions 34. In this manner, the holding member 50 can be easily attached to and detached from the base member 30.

Further, the grooves 52 to which the holding portion 51 fits are formed in the attachment surface 33. In this manner, an increase in height of the wiring module 20 along the normal direction of the attachment surface 33 can be suppressed.

Variation

Figure 6:
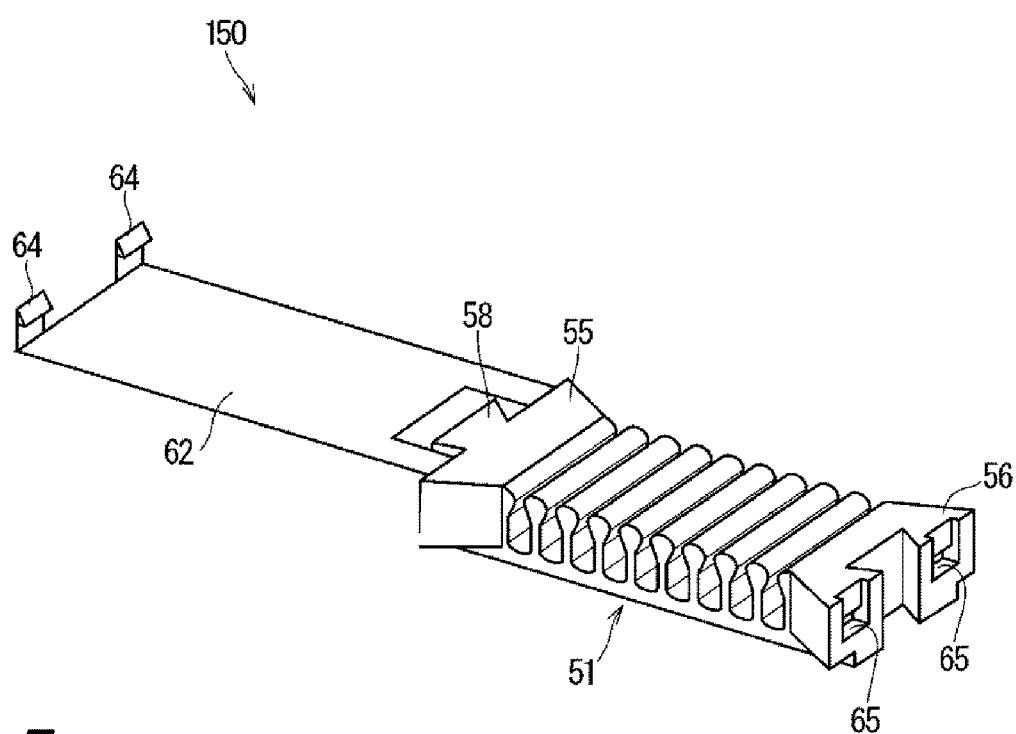
FIG. 6 is a perspective view showing a variation of the holding member.
Figure 7:
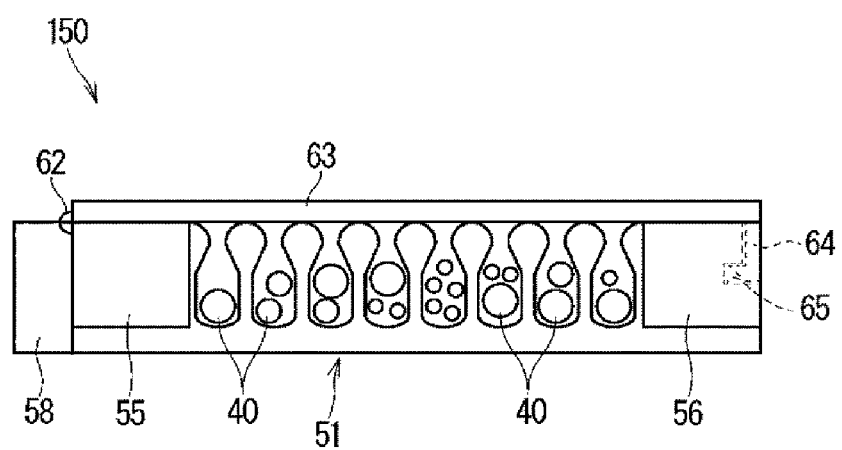
FIG. 7 is a front view showing a variation of the holding member.

FIG. 6 is a perspective view showing a variation of the holding member 50. FIG. 7 is a front view showing the variation of the holding member 50.

A holding member 150 according to the variation is different from the holding member 50 in that a lid portion 62 is further included. The lid portion 62 covers the plurality of grooves 52. In this manner, due to the lid portion 62, the wiring members 40 can be inhibited from coming out of the grooves 52.

In the example shown in FIG. 6, the lid portion 62 is integrally molded with the holding portion 51 and the attachment portions 54. The lid portion 62 is provided at one attachment portion 54 via a hinge 63. Locking portions 64 are provided at the lid portion 62. Locking target portions 65 are provided at the other attachment portion 54. In the state where the lid portion 62 is closed, the locking portions 64 lock to the locking target portions 65. In this manner, the lid portion 62 is kept in a closed state.

The lid portion 62 may also be molded separately from the holding portion 51 and the attachment portion 54. For example, the locking portions 64 may be provided at the two sides of the lid portion 62, and the locking target portions 65 may be provided at the two attachment portions 54.

In addition, in the above description, the base member 30 is a member embedded between the door panel 12 and the door trim 16. However, such a configuration is not essential. For example, the base member 30 may also be a member embedded between a roof panel and a roof lining, or a member embedded between exterior members that constitute the outer appearance of the vehicle and interior members that constitute the inner appearance of the vehicle. Also, for example, the base member 30 may also be an interior member such as a door trim 16, a roof lining, an instrument panel, or the like.

Also, the holding portion 51 may also be formed such that the openings of the grooves 52 are not elastically deformable so as to be widened. Also, the holding portion 51 may also be formed such that the bottom plate 51a is not elastically deformable so as to bend axially. The protrusions 53 do not need to be formed at the openings of the grooves 52.

Further, the attachment portions 54 and the attachment target portions 34 may also have a structure other than the protrusions fitting into the recesses. For example, the attachment portions 54 and the attachment target portions 34 may also have a locking structure such as the locking portions 64 and the locking target portions 65.

Also, the attachment direction of the attachment portions 54 and the attachment target portions 34 may also be different from the linking direction of the first linking portions 57 and the second linking portions 59. In this case, the link between the two linked holding members 50 cannot be released in the state where the holding members 50 are attached to the base member 30. For example, one of the attachment direction and the linking direction may be parallel with the normal direction of the attachment surface 33, and the other may be a direction orthogonal to the normal direction (direction along the attachment surface 33). The direction orthogonal to the normal direction may be parallel with the direction in which the plurality of grooves 52 are arranged side by side, or the direction parallel with the direction in which the grooves 52 extend.

The first linking portion 57 and the second linking portion 59 can also be used as the attachment portions 54. For example, a configuration is also possible in which, in the holding member 50, the attachment portions 54 are omitted, and a recess to which the first linking portion 57 fits and a protrusion that fits to the second linking portion 59 may be formed as the attachment target portions 34 of the base member 30.

Further, the first linking portions 57 and the second linking portions 59 may also be omitted from the holding members 50. The holding members 50 may not be capable of linking to each other. In this case, at the attachment location APS, a holding member 50 having a holding portion 51 that is longer than the holding portion 51 of the holding member 50 of the attachment location AP1 may be attached. Further, at the attachment location APS, two holding members 50 that are the same as the holding member 50 at the attachment location AP1 may also be separately attached.

Further, in the wiring module 20, the holding members 50 may be attached with the openings of the grooves 52 facing the attachment surface 33. In this case, the attachment surface 33 functions as a lid for the openings of the grooves 52, making it possible to inhibit the wiring members 40 from coming out of the grooves 52.

Further, in the wiring module 20, the two holding members 50 may be linked such that the openings of the grooves 52 face each other. In this case, one holding member 50 functions as a lid for the openings of the grooves 52 of the other holding member 50, making it possible to inhibit the wiring members 40 from coming out of the grooves 52. The holding members 50 may also have a linking portion that makes it possible for two holding members 50 to link to each other in the height direction.

Note that, the constituent elements described in the above embodiments and variations may be combined as appropriate as long as no mutual contradictions arise.

LIST OF REFERENCE NUMERALS

10 Door
12 Door panel
13 Outer panel
14 Inner panel
15 Opening
16 Door trim
18 Device
20 Wiring module
30 Base member
32 Main plate portion
33 Attachment surface
34 Attachment target portion
35 First wall portion
36 First recess
37 Second wall portion
38 Second recess
39 Fitting groove
40 Wiring member
41, 42, 43 Wire
50, 150 Holding member
51 Holding portion
51a Bottom plate
51b Partition
52 Groove
53 Protrusion
54 Attachment portion
55 First protrusion
56 Second protrusion
57 First linking portion
58 Linking Protrusion
59 Second linking portion
60 Linking recess
62 Lid portion
63 Hinge
64 Locking portion
65 Locking target portion
C Connector
AP Attachment location

What is claimed is:

1. A wiring module comprising:
a base member including an attachment surface on which an attachment target portion is formed;
a plurality of wiring members arranged on the attachment surface; and
a holding member configured to be attached to the attachment target portion while holding the plurality of wiring members,
wherein
the holding member includes
a holding portion formed by a plurality of grooves arranged side by side, each of the plurality of grooves having an opening capable of receiving one or more of the plurality of wiring members, and
an attachment portion configured to be detachably attached to the attachment target portion,
when the holding member is attached to the attachment target portion, the holding member is attached in an orientation with the opening facing the attachment surface,
the attachment target portion is provided at each of a plurality of attachment locations along paths of the plurality of wiring members on the attachment surface, and
at each of the plurality of attachment locations, the plurality of wiring members are divided, housed and held in the plurality of grooves.

2. The wiring module according to claim 1, wherein
in a state where at least the holding member is not attached to the base member, the holding portion is elastically deformable such that openings of the grooves that are on the opposite side to bottoms of the grooves widen.

3. The wiring module according to claim 2, wherein
in a state where the holding member is not attached to the base member, the holding portion is elastically deformable so as to bend around an axis parallel with an extension direction of the grooves, the openings of the grooves that are on the opposite side to the bottoms of the grooves widen in a state where the holding portion bends in one direction around the axis, and the attachment portion is attached to the attachment target portion in a manner capable of inhibiting the holding portion from bending in the one direction around the axis.

4. The wiring module according to claim 2, wherein protrusions that narrow a width dimension of the grooves are provided at the openings of the grooves that are on the opposite side to the bottoms of the grooves.

5. The wiring module according to claim 1, wherein the holding member further includes a first linking portion provided on one side of the holding portion and a second linking portion provided on the other side of the holding portion,
in at least one attachment location of the plurality of attachment locations, the first linking portion of one holding member and the second linking portion of another holding member link to each other, and
the plurality of grooves forming the holding portion of the one holding member are disposed in line with the plurality of grooves forming the holding portion of the other holding member and are disposed perpendicular to an extension direction of the plurality of wiring members.

6. The wiring module according to claim 1, wherein the holding member further includes a lid portion for covering the plurality of grooves.

7. The wiring module according to claim 1, wherein the attachment portion and the attachment target portion are provided at two sides of the holding portion,
one of the attachment portion and the attachment target portion includes a protrusion surface and a protrusion protruding from the protrusion surface, the other of the attachment portion and the attachment target portion including a recess surface and a recess formed in the recess surface, and
the attachment portion is detachably attached to the attachment target portion by the protrusion fitting in the recess.

8. The wiring module according to claim 1, wherein a fitting groove to which the holding portion fits is formed in the attachment surface.

9. The wiring module according to claim 1, wherein the holding member is formed by a plurality of holding members divided and provided in a plurality of attachment locations arranged at intervals along an extension direction of the plurality of wiring members.

10. A wiring module comprising:
a base member for covering an opening of a door panel, the base member including an attachment surface on which an attachment target portion is formed;
a plurality of wiring members arranged on the attachment surface; and
a holding member attached to the attachment target portion while holding the plurality of wiring members,
wherein
the holding member includes a holding portion formed by a plurality of grooves arranged side by side, and an attachment portion configured to be detachably attached to the attachment target portion,
the attachment target portion is provided at each of a plurality of attachment locations along paths of the plurality of wiring members on the attachment surface,
at each of the plurality of attachment locations, the plurality of wiring members are divided, housed and held in the plurality of grooves, and the attachment target portion is provided on the attachment surface without using a hole that passes through the base member.

11. A wiring module comprising:
a base member including an attachment surface on which an attachment target portion is formed;
a plurality of wiring members arranged on the attachment surface; and
a holding member attached to the attachment target portion while holding the plurality of wiring members,
wherein
the holding member includes a holding portion formed by a plurality of grooves arranged side by side, and an attachment portion configured to be detachably attached to the attachment target portion,
the attachment target portion is provided at each of a plurality of attachment locations along paths of the plurality of wiring members on the attachment surface,
at each of the plurality of attachment locations, the plurality of wiring members are divided, housed and held in the plurality of grooves,
the holding member further includes a first linking portion provided on one side of the holding portion and a second linking portion provided on the other side of the holding portion, and in at least one attachment locations of the plurality of attachment locations, the first linking portion of one holding member and the second linking portion of another holding member link to each other,
the attachment portion and the attachment target portion are provided at two sides of the holding portion, and the attachment portion is detachably attached to the attachment target portion by a protrusion formed at one of the attachment portion and the attachment target portion fitting in a recess formed at the other of the attachment portion and the attachment target portion,
the first protrusion is formed as the attachment portion on the one side of the holding portion,
the second protrusion is formed as the attachment portion on the other side of the holding portion,
a linking protrusion protruding from the first protrusion is provided as the first linking portion, and
a linking recess to which the linking protrusion fits is provided as the second linking portion.

12. A wiring module comprising:
a base member including an attachment surface on which an attachment target portion is formed;
a plurality of wiring members arranged on the attachment surface; and
a holding member attached to the attachment target portion while holding the plurality of wiring members,
wherein the holding member includes a holding portion formed by a plurality of grooves arranged side by side, and an attachment portion configured to be detachably attached to the attachment target portion, and is attached in an orientation with openings of the plurality of grooves facing the opposite side to the attachment surface,
the attachment target portion is provided at each of a plurality of attachment locations along paths of the plurality of wiring members on the attachment surface,
at each of the plurality of attachment locations, the plurality of wiring members are divided, housed and held in the plurality of grooves,
a fitting groove to which the holding portion fits is formed in the attachment surface, and due to the holding portion fitting to the fitting groove, bottom portions of the plurality of grooves are level in height with a portion of the attachment surface that is adjacent to the fitting groove.

* * * * *